United States Patent [19]

Hill

[11] 4,321,455
[45] Mar. 23, 1982

[54] METHOD FOR WELDING BATTERY TERMINAL CONNECTORS TO ELECTRODE GRID TABS

[75] Inventor: Michael S. Hill, Gainesville, Fla.

[73] Assignee: General Electric Company, Gainesville, Fla.

[21] Appl. No.: 954,481

[22] Filed: Oct. 25, 1978

[51] Int. Cl.³ .............................................. B23K 9/08
[52] U.S. Cl. ................................. 219/123; 29/623.1; 219/121 PV; 219/121 PX; 219/125.11
[58] Field of Search ..................... 219/122, 123, 125.1, 219/125.11, 121 PV, 121 PT, 121 PX; 29/623.1

[56] References Cited

U.S. PATENT DOCUMENTS

| 1,402,881 | 1/1922 | Murchie | 219/159 X |
| 1,792,243 | 2/1931 | Richter | 219/123 X |
| 2,522,146 | 9/1950 | Tichenor | 219/125.11 |
| 3,701,881 | 10/1972 | Rothen | 219/137 R |
| 4,037,077 | 7/1977 | Harder | 219/123 |

FOREIGN PATENT DOCUMENTS

| 50-26504 | 9/1975 | Japan | 219/123 |
| 1045149 | 7/1962 | United Kingdom | 219/123 |
| 490593 | 3/1976 | U.S.S.R. | 219/123 |

*Primary Examiner*—Elliot A. Goldberg
*Attorney, Agent, or Firm*—Morgan, Finnegan, Pine, Foley & Lee

[57] ABSTRACT

The process and apparatus according to the present invention includes positioning the tab portion(s) of a particular electrode grid and the connector portion of a terminal connector in working proximity to an arc welding apparatus, activating the torch and varying a magnetic field around the torch "flame" to alter the angular orientation of the "flame" relative to the torch tip for moving the "flame" in a generally elliptical pattern. As preferably embodied, a variable electromagnetic field is generated around the torch "flame" by at least four electromagnet probes positioned in oppositely disposed pairs around the torch which is a plasma arc welding apparatus. According to another aspect of the invention, the cell core is positioned adjacent the torch by moving the cell core towards the torch in a direction parallel to the longitudinal axis of the torch "flame".

7 Claims, 14 Drawing Figures

METHOD FOR WELDING BATTERY TERMINAL CONNECTORS TO ELECTRODE GRID TABS

BACKGROUND AND OBJECTS OF THE INVENTION

The present invention relates generally to welding apparatus and more particularly to methods and apparatus for welding various battery components, specifically battery terminal connectors to electrode grid/plates where the battery components are made from lead. Subject matter of this application is related to co-pending application Ser. No. 954,485, filed Oct. 25, 1978, filed simultaneously herewith and assigned to the same assignee as this application.

In the relatively recent past, there has been an increasing trend towards making a greater variety of rechargeable electrolytic power cells in the more commercial sizes such as D-size (or "flashlight size") batteries. This has been particularly true in the case of one of the most common secondary cells-the lead-acid battery. The principal battery constituents in such cells include the positive plate and the negative plate (both usually in the form of expanded metal grids), porous separators located between the plates and an electrolyte.

The plates, with the separators located on each side thereof, are rolled up into a wound battery cell core. The cell core and the electrolyte are then placed in a suitable container which is eventually sealed closed with a top. The electrode grids are usually formed with small tab portions protruding up from the top of the wound cell core for ultimate connection to a battery terminal on the finished battery.

In lead-acid cells, both electrode grids are made from lead as are terminal connectors which electrically coupled each grid to its corresponding battery terminal. Because the components are made of lead, they are relatively easy to weld together since lead has such a low melting point. However, the low melting point can also be the source of problems because of the electrode grids than solid. If the tabs were exposed to an excessive amount of heat, the portions of the tabs, which are directly connected to the grids, might be melted, either completely separating the tab from its corresponding electrode grid or so weakening the connection as to carry only a very small current. The cell would thus be rendered useless, or at least weakened even if only one tab were so separated.

During the welding, portions of the tab could also melt and drop down to the cell core and possibly couple the two oppositely-poled electrode grids together. Similarly, the heat might even be sufficient to fuse small portions of the two different electrode grids together. In either event, the cell would have an inherent short circuit and would be rendered useless. Therefore, it is important, particularly in welding lead battery components, to provide sufficient heat for welding the lead yet prevent complete destruction or even partial deterioration of the the connective tab portion as well as dripping of molten lead.

One prior art patent, U.S. Pat. No. 3,873,803 issued to Young et al., has suggested using an electrode head for laterally moving the torch "flame" of an arc welding apparatus to weld posts members to a cell core. Although this approach has provided satisfactory results in certain respects, the cell pack (or core) must be physically moved simultaneously with the torch "flame" while the components are being welded. Thus, additional apparatus is required for effecting such movement, but if carried out by hand there is a danger that the target will be exposed to the heat for too long, thereby rendering the welding process susceptible to the foregoing drawbacks. In addition, there is no convenient means for automatically retaining the terminal connector in place during the welding operation.

Accordingly, it is an object of the present invention to provide new and improved process steps and apparatus for welding small battery components particularly lead terminal connectors to a corresponding lead electrode grid in sealed lead-acid batteries. Another object of the invention is to provide such new and improved process steps and apparatus wherein a secure electrical contact is made between the desired components without causing any discontinuities or separations in any portions of either part.

It is also an object of the present invention to provide such new and improved process steps and apparatus, which obviates the need for using solders or fluxes.

It is a further object of the invention to provide such new and improved process steps and apparatus, which eliminates the need for moving either welding torch or the cell core while a particular weld is being performed.

It is yet another object of the present invention to provide such new and improved process steps and apparatus, which enable the terminal connector to be retained in place just prior to and during each welding operation.

It is still a further object of the present invention to provide such new and improved process steps and apparatus, which substantially prevent the heat of welding from affecting any other nearby components in the cell core.

It is also another object of the present invention to provide such new and improved process steps and apparatus which enable heat sink means to be conveniently located around the weld target of the workpiece.

Objects and advantages of the invention are set forth in part herein and in part will be appreciated herefrom or may be learned from practice with the invention, the same being realized and attained by means of the steps, and operations as well as the instrumentalities and combinations provided out in the appended claims. Accordingly, the invention resides in the novel steps and processes, and parts, constructions, combinations and improvements herein shown and described.

SUMMARY OF THE INVENTION

Briefly described, the process and apparatus according to the present invention includes positioning the target area (tab portion(s) of a particular electrode grid and the terminal connector to be welded) of a battery cell core in working proximity to an arc welding apparatus, activating the torch and varying a magnetic field around the torch "flame" to alter the angular orientation of the "flame" relative to the torch tip for moving the "flame" in a generally elliptical pattern. As preferably embodied, a variable electromagnetic field is generated around the torch "flame" by at least four electromagnet probes positioned in oppositely disposed pairs around the torch while is a plasma arc welding apparatus.

According to another aspect of the present invention, the cell core is positioned adjacent the torch by moving the cell core towards the torch in a direction parallel to the longitudinal axis of the torch "flame". In addition, heat sink means are also positioned to surround most of the target area prior to energization of the arc torch.

It will be apparent from the foregoing general description that the objects and advantages of the invention, specifically enumerated herein, are achieved by the invention as herein disclosed.

Accordingly, it has been found that by controllably varying a magnetic field around the torch "flame" to vary its angular orientation, the "flame" can be moved over the target area in a predetermined pattern. The cell core, therefore, can remain stationary while the "flame" traverses the target area, thereby significantly reducing the amount of apparatus required to perform the welding operation. Moreover, the movement of the "flame" can be confined within a predetermined area to ensure that it does not damage any portions of the cell core or other components, and the movement pattern can be identically repeated, if desired, to ensure a secure weld.

It has also been found that by moving the cell core up to the torch, a simple securing member can be provided for retaining the terminal connector in place during the welding operation. Moreover, a relatively uncomplicated two-part heat sink device can also be provided with the two parts moving together after the cell core is moved up into position to surround the target area and to help pinch the grid tab portions.

It will be understood that the foregoing general description as well as the following detailed description are exemplary and explanatory of the invention but are not restrictive thereof.

The accompanying drawings, referred to herein and constituting a part hereof, illustrate preferred embodiments of the invention and, together with the detail description, serve to explain the principles of the invention.

BRIEF DESCRIPTION OF DRAWINGS

FIG. 4b is an enlarged view of a portion of FIG. 4a.

FIG. 11b is a plan view of the cell holder shown in FIG. 11a.

DETAILED DESCRIPTION OF PREFERRED EMBODIMENTS

Referring now to the embodiments of the invention illustrated in the accompanying drawings wherein like reference numbers refer to like parts throughout the various views, the embodiment shown in FIGS. 1–6 illustrates various aspects of welding apparatus for welding terminal connectors (which, in turn, are coupled to a battery terminal) to the positive and/or negative plates in a battery cell, in accordance with the present invention.

Figure 1:
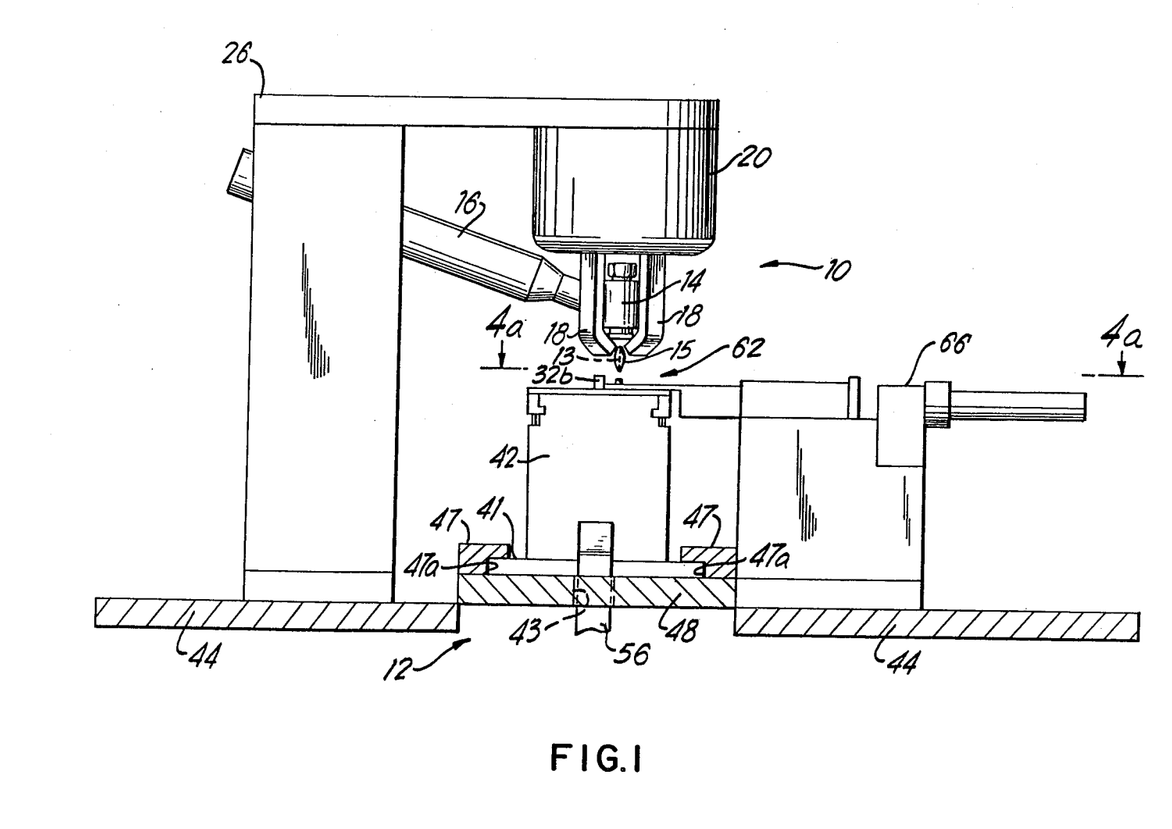
FIG. 1 is a front elevation view partially sectioned, of welding apparatus according to the present invention.
Figures 2, 3:
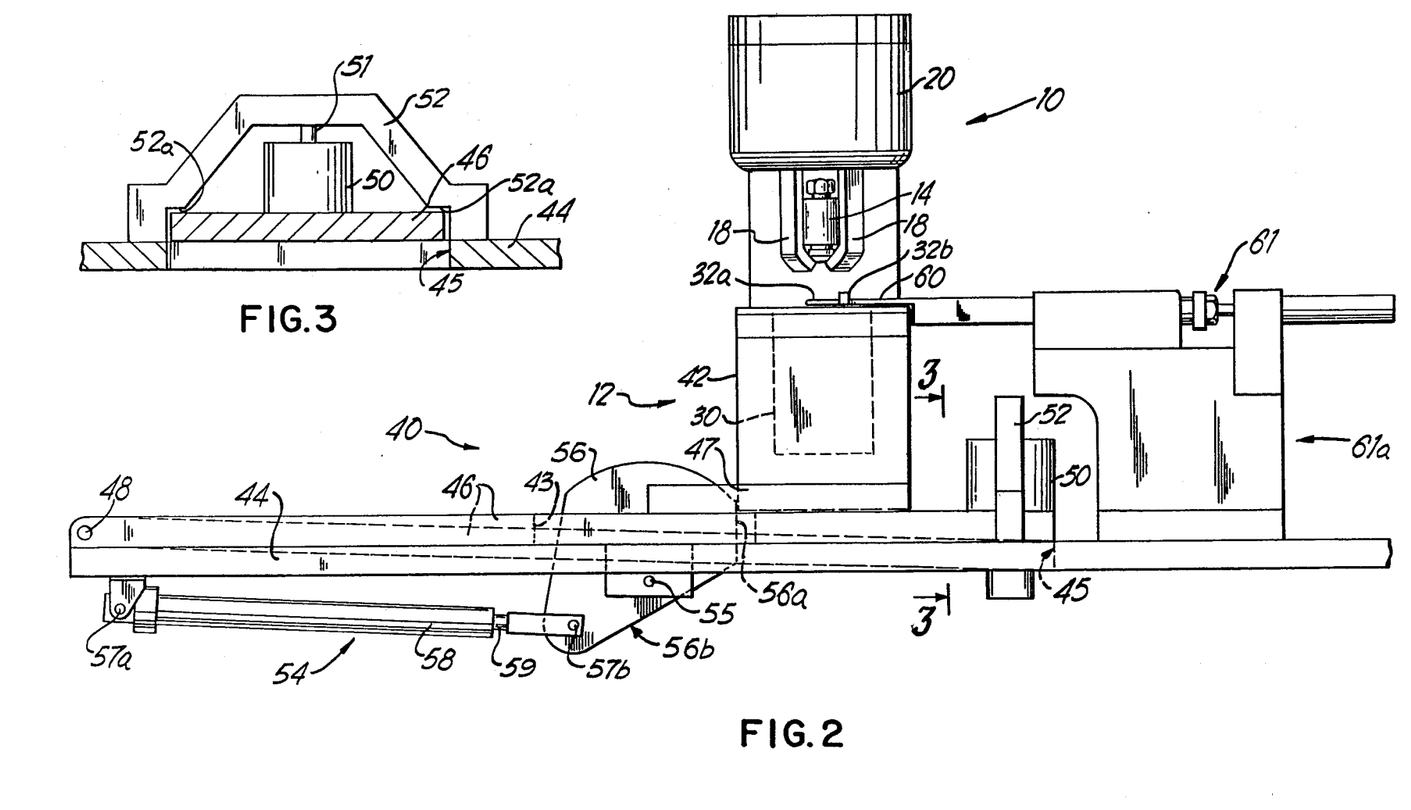
FIG. 2 is a side elevation view of the apparatus shown in FIG. 1, with the heat sink assembly omitted for clarity.
FIG. 3 is a sectional view taken along section lines 3—3 of FIG. 2 of the lifting mechanism shown therein.

Turning first to FIGS. 1–3, there is shown an embodiment of welding apparatus for welding the tabs of each of the two electrode grids to their corresponding terminal connectors (sometimes called "posts"). As here embodied, the welding apparatus includes a welding torch assembly (indicated generally at 10) and a workpiece support assembly (indicated generally at 12).

Torch assembly 10 includes torch head 14 coupled to a suitable source of "flame"-generating component(s) by conduit 16. According to the invention, torch head 14 is an ionizable gas arc torch apparatus, preferably a plasma arc welding apparatus such as the WC 122/P515 welding system sold under the trademark "THERMALARC" by Thermal Dynamics Corporation of West Lebanon, New Hampshire. Thus, conduit 16 can act as a conduit for the gas used in the torch and the electrical conductors coupled between the torch head (14) and the console/power supply (not shown) for the torch assembly.

According to a first aspect of the invention, the angular orientation of the longitudinal axis (indicated at 13 in phantom) of the torch "flame" (i.e., the hot gases indicated at 15, emanating from torch head 14) is adapted to be varied relative to a reference plane (e.g., the horizontal plane passing through the tip of torch head 14) so that the tip of the "flame" defines a generally elliptical pattern, preferably by controlled variation of a magnetic field around the torch "flame". To this end, four electromagnet elements, or probes (each indicated at 18, although only two such elements are visible in FIGS. 1 and 2), are positioned around the tip of the torch head (14) to control the torch "flame" that projects therefrom during the welding operation. The electromagnet elements (18) are also operatively coupled to a sequencer control device (a portion of which is indicated at 20).

Figure 5:
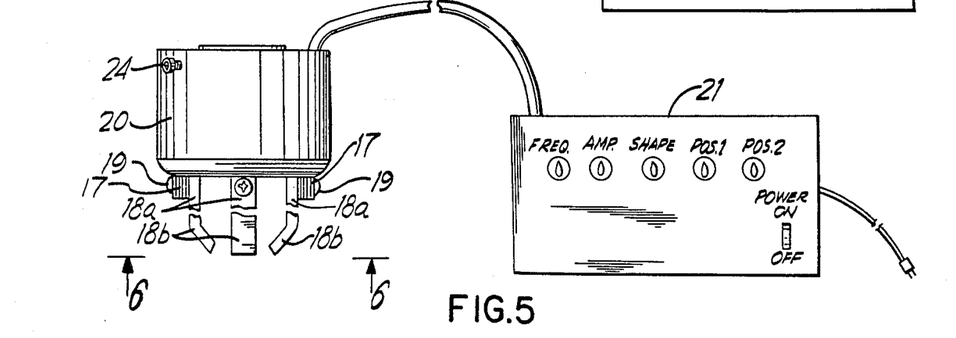
FIG. 5 is a side elevation of an embodiment of torch control apparatus according to the present invention.

The four electromagnet elements 18 are arranged in oppositely disposed pairs, preferably symmetrically around the tip of torch head 14, and the strength of the electromagnetic field generated by each pair of elements 18 is controllable via sequencer 20 which will be described more fully below. As shown in FIGS. 1, 2 and 5, each electromagnet probe 18 extends downwardly from the bottom of the housing for sequencer 20 and includes a first leg portion (indicated at 18a) adapted to be secured to the portions of the iron plates (designated 17) which protrude through the bottom of the sequencer housing (as by mounted screws 19) and a second leg portion (indicated at 18b) which extends from the end of first leg 18a and is inclined radially inwardly toward the other electromagnet element (18) in each corresponding pair to define a substantially reduced area as compared with the area defined by the attachment leg segments 18a. Each probe 18 is, e.g., about $\frac{1}{2}''$ wide and the tip of each leg 18b is spaced about $\frac{5}{8}''$ from the tip of the other probe in each corresponding pair;

each leg portion 18a is about 2" long and each leg portion 18b is about 1" long, forming an angle of about 135° with leg portion 18a.

Figures 6, 7, 8:
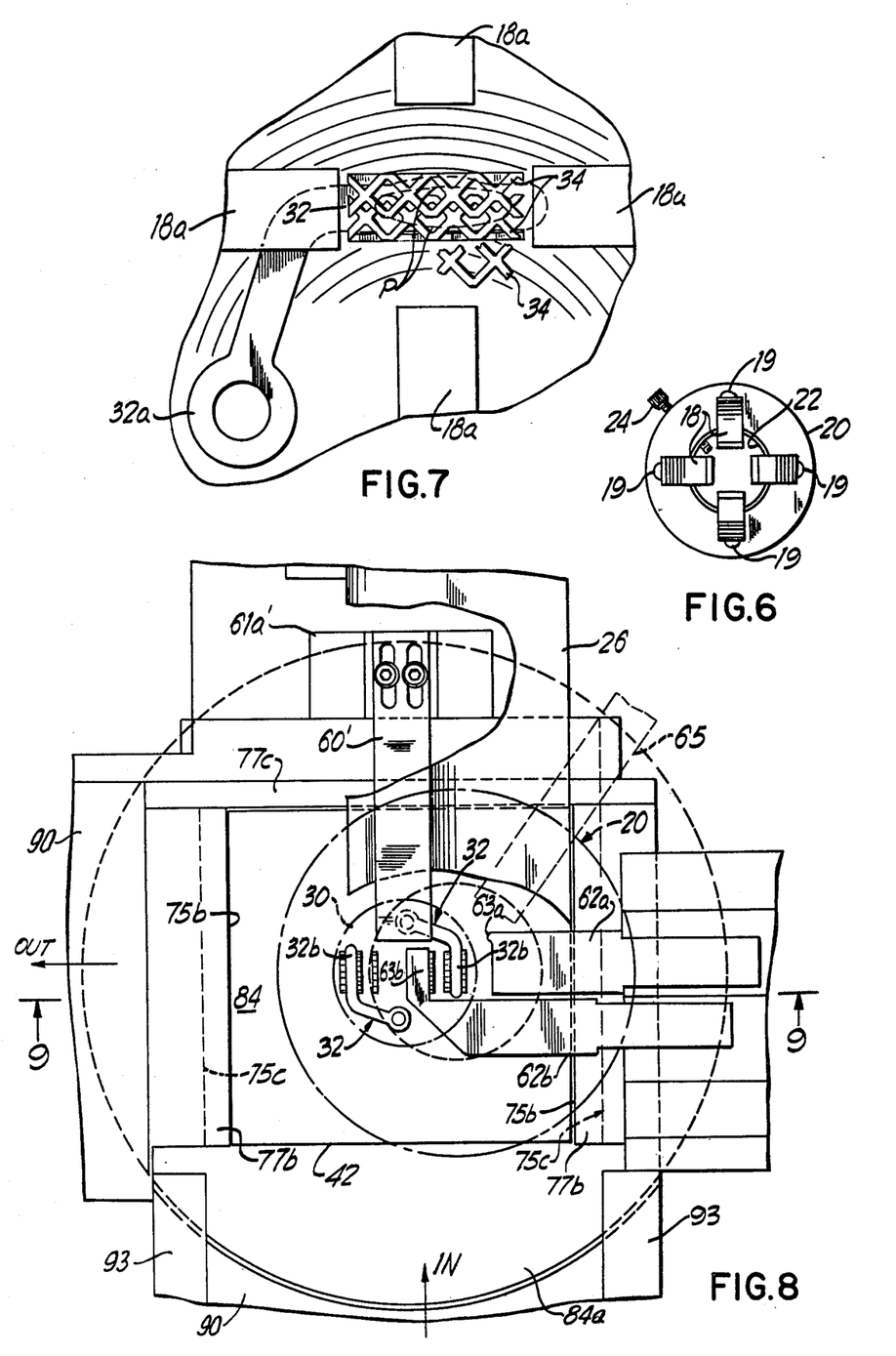
FIG. 6 is a sectional view taken along section 6—6 of FIG. 5.
FIG. 7 is an enlarged view of the target area of the workpiece located under the welding apparatus of FIG. 1 just prior to welding.
FIG. 8 is a plan view of an alternate embodiment of a workpiece support assembly according to another aspect of the invention.

As best shown in FIGS. 5 and 6, sequencer 20 includes a generally torroidal-like cylindrical housing which encases the internal portions (not shown) of the iron plates (17), around which windings of wiring are wrapped for converting each set of plates (and, therefore, each electromagnet probe 18 coupled thereto) into an electromagnet. The windings of wiring are coupled to a suitable control/power-source apparatus (indicated generally at 21). The housing is preferably formed with a central cavity 22 in which a portion of the torch head 14 can be located (and retained by lock nut 24) so that the torch "flame" emanating therefrom will be controllable by the magnetic field developed by electromagnet probes 18. Locknut 24 may be threadably engageable through the sequencer housing to protrude into the cavity 22 for grasping the portion of torch head 14.

The control/power-source module (21) which is coupled to sequencer 20 is adapted to provide the current (and enable variation thereof) for energizing electromagnet probes 18 and providing the variations in the magnetic field necessary for generating the desired pattern of movement of the torch "flame". To this end, sequencer 20 and power/control module 21 may be an arc magnetic apparatus such as model 90/4613 control/probe sold by Cyclomatic Industries, Inc., San Diego, California, except that the electromagnet elements (18) are formed as described above.

Accordingly, the magnetic field produced by each cooperating pair of probes 18 can thereby be controllably varied in strength and polarity, as well as in the frequency with which a given strength and polarity occur so that any desired "flame" pattern can be achieved and repeated at any desired frequency. In addition, the location of the center of the "flame" pattern can be controlled by the "POSITION 1" and "POSITION 2" controls. It will be understood that sequencer 20 and conduit-housing 16 may be supported above the workpiece (described more fully below) by any suitable support structure (indicated generally at 26).

In operation, the torch head 14 is installed within sequencer housing cavity 22 and held in place by locknut 24 so that the tip of torch head 14 resides in about the same plane as that defined by the tips of the electromagnetic probes 18, preferably with the center of the torch tip—i.e., the area from which torch "flame" 15 emanates—centered relative to the tips of all the electromagnet probes 18. The workpiece is then positioned (as described more fully below) with the target area thereof in appropriate position under torch head 14.

The particular workpiece to be welded in accordance with the preferred embodiments of the invention consists of the tab portions (34) of the electrode grids (not shown), which project upwardly from the wound battery cell core 30, and the terminal connectors (32) which are ultimately coupled to the terminals (not shown) of the finished battery. The target for the welding is the connecting portion (32a) each terminal connector 32 over which tab portion(s) 34 (extending upwardly from the wound cell core) are folded, as shown in FIG. 7. Three tabs are shown folded over connecting portion 32a, although a portion of one is broken away for clarity. Thus, it will be seen that portion 32a is located between two adjacent tab portions (preferably the two most radially outward tabs) which are folded over the connecting portion 32a, with a third tab folded thereover. The tabs may be so folded by hand operation or reliance may be made only on the pinching by the heat sink described more fully below.

Once the connector portion 32a is placed in the desired position below torch head 14, the welding torch is activated to strike the appropriate arc "flame". Advantageously, sequencer 20 is continuously energized by control/power-source 21 to establish the desired varying electromagnetic field around the torch head and instantaneously produce the necessary varying field for moving the "flame" in a desired pattern. It will be understood that the pattern of travel is actually achieved by varying the angular orientation of the longitudinal axis of the "flame" relative to the horizontal plane passing through the tip of torch head 14.

A plasma arc welding apparatus is preferred since it produces a realtively long "flame" as compared with Tungsten Inert Gas or other arc welding devices. The long "flame" is particularly advantageous because it can remain in contact with the target over the entire path it follows when subjected to the varying magnetic field, despite being angularly deflected thereby. As preferably embodied, the pattern followed by the "flame" is generally in the shape of an ellipse (as shown at P in FIG. 7) which is sized and positioned to remain only over the connecting portion (32a) of terminal connector 32 to provide a weld over a substantial portion of connecting portion 32a without having to move the cell core during the weld operation.

Since the control of the torch "flame" provided by the present invention enables the "flame" to remain in constant contact with the weld target, the plasma arc welder is further advantageous because it utilizes hydrogen. The hydrogen flowing from torch head 14 will reduce the excessive oxides of the lead (which is used for the battery electrode grids and terminal connectors in lead-acid batteries), which normally occurs when the material is continuously exposed to high temperatures for relatively long periods of time. Thus, any oxide interface tending to develop between the surfaces being welded during such constantcontact welding, which would otherwise hinder the formation of a good bond, will be substantially eliminated through chemical reduction by the hydrogen.

According to another aspect of the invention, workpiece support assembly 12 is adapted to position the battery cell core 30 in suitable position below the torch head 14 by moving it upwardly into that position adjacent the torch "flame". To this end, and as best illustrated in FIG. 2, lifting apparatus (indicated generally at 40) is located under torch assembly 10 and is adapted to receive the cell-holder fixture (indicated generally at 42) which, as will be described more fully below, is adapted to hold the battery core (30) during the weld operation to prevent damage thereto or unwinding thereof. Lifting apparatus 40 is also adapted to position the target portion of terminal connector 32 to about the tip of the torch "flame" (15) which may be about 3/16" to abut 5/16" in length for use with the varying magnetic field described above.

Referring generally to FIGS. 1–3, one embodiment of lifting assembly 40 includes base member 44 (which may form the base upon which other structures such as supports 26, 61a and 68 are mounted) and movable support member 46 pivotally attached (as by hinge 48) at one end to base member 44. The free end of support member 46 is coupled to a lifting mechanism which includes a lifting device (such as air cylinder 50) mounted to the end of support member 46 and having the end of its extensible/retractable shaft 51 attached to base member 44 by a generally U-shaped bracket (52). Thus, when air cylinder 50 is activated by suitable activation means (not shown) to extend shaft 51, the cylinder will be pushed downwardly to move the free end of support member 46 downwardly (by about ½" which is sufficient clearance for removing cell-holder 42) into a slot (indicated at 45) formed in base member 46, as indicated in phantom in FIG. 2. (It will be understood that slot 45 has about the same dimensions as member 46 to permit receipt thereof). Similarly, when cylinder 50 is activated to retract shaft 51, cylinder 50 is pulled upwardly until the end of support member 46 rests against the shoulders (52a) formed on bracket 52, as shown in FIGS. 2 and 3.

Support member 46 also includes means for securing cell-holder assembly 42 (which is described more fully below) in place during the lifting operations. For this purpose, a pair of generally L-shaped guide members 47 are attached to the top surface of support member 46, each guide defining a slot (indicated at 47a) with support 46 for permitting slidable engagement with the bottom plate (41) of cell-holder 42. Thus, plate 41 of the cell-holder 42 is slidably inserted into the slots (47a) formed between guides 47 and member 46 until it abuts a suitable stop (not shown) at the end of guides 47 for precisely positioning the cell core (30) relative to torch head 14. Thereafter, support member 46 is moved upwardly for welding, as described above, and then down either to permit rotation of cell-holder 42 for welding the other terminal connector or simply to remove the cell-holder from the support assembly. It will be understood that the cell core will thus be securely held in the proper position for the welding operation by the support/guide (46/47) assembly.

Also as preferably embodied, a locking mechanism (indicated generally at 54) is mounted to support member 46 for lockably securing the cell-holder assembly in position within guides 47. Locking mechanism 54 includes a block-like member (56) pivotally mounted, by hinge 55, to support member 46 wherein slot 43 is formed to accommodate block 56. Block 56 includes a first straight edge (56a) adapted to abut cell-holder assembly 42 when properly located within guide 47, and a second straight portion (56b) adjacent first straight edge 56a and spaced from pivot 55 by no more than the distance pivot 55 is spaced from the top surface of support member 46 when in the "down" (phantom) position.

Locking mechanism 54 also includes elongate air cylinder 58 (or any other suitable device for rotating block 56) which is pivotally attached (as by hinge 57a) to the bottom of base member 44 at about the same location as hinge 48 but on the other side of base 44. The extensible/retractable shaft (59) of cylinder 58 is pivotally attached at its free end to block 56 generally at a point located on the opposite side of pivot 55 from edge 56a. Cylinder 58, like cylinder 50, is operatively coupled to suitable activation means (not shown) so that when shaft 59 is retracted, block 56 will be oriented with first edge 56a extending vertically to abut cell-holder 42 and keep the cell-holder in a fixed position within slots 47a); and when shaft 59 is extended, block 56 will be rotated to position second edge 56b generally flush with the top surface of support member 46 for enabling the cell-holder to be slidable removed from guides 47 without obstruction by block 56.

Also, advantageously, support assembly 12 includes means for holding the terminal connectors in place during the welding operation. In one embodiment (best shown in FIGS. 2 and 4a) post placement support 60, which comprises a generally rigid bar-like member, is attached to air cylinder 61 (or other similar device) which, in turn, is mounted to a suitable base member (indicated generally at 61a). The end edge of support 60 is formed to the same configuration as the post portion (32b) of terminal connector 32 and the connective segment between post portion 32b and connecting portion 32a. In operation, once cell-holder 42 has been lifted into place, air cylinder 61 is actuated (by suitable actuation means, not shown) to move post support 60 from a retracted position to an extended position with its suitably formed end edge abutting post portion 32a for holding the terminal connector steady during the welding operation. Once the welding step is completed, cylinder 61 is actuated to retract support 60 so that support 46 can be lowered, as described above.

Alternatively, however, the post placement device may simply comprise a generally rigid member adapted to abuttingly engage the top of the post portion (32b) of the terminal connector to be welded, such as member 60' shown in FIG. 8. Placement device 60' is attached to a suitable support (such as support 61a) without an air cylinder or like device so that it projects over the anticipated location of the post portion (32b) like a cantilever. Thus, as cell-holder 42 is raised to the welding position, the top of the post portion (32b) of the terminal connector (32) to be welded will just abut the bottom surface of placement device 60' to hold the terminal connector against the top of cell-holder 42 (as will be described more fully below) and thereby prevent movement during the welding operation.

It will be understood that placement device 60' may be slightly flexible to provide a bias-like force to urge post portion 34b against the top of the cell-holder (42). In addition, the edges of member 60' should be proportioned so as not to cover any of the target area of the connecting portion (32a). It will also be understood that member 60' will be located slightly higher than and extend farther inwardly than device 60 in FIG. 2 to engage the top of post 32b.

In operation, cell core 30 is placed in a predetermined position and orientation within cell-holder 42 (to be described below) which is then inserted, by base plate 41, into the slots between the guides (47) and the support member (46). The end support member 46 is lifted toward torch head 14 by activating cylinder 50 to retract its shaft (51). As cell core 30 is moved into the welding position, the top of connector post 32b will automatically abut the bottom surface of post support 60'. Thus, the terminal connector (32) to be welded will be retained in its desired location by the force exerted by placement device 60', tending to urge post portion 32b against the top of cell core 30.

In connection with moving the workpiece (i.e., battery cell core 30) up into the welding position, a relatively simple heat sink apparatus may also be utilized for surrounding the target area. As preferably embodied, the heat sink apparatus (indicated generally at 62 in FIGS. 4a and 4b) includes two plate members 62a and 62b which are positioned side-by-side in generally abutting relation but are slidable relative to each other in the directions indicated by the arrows in FIG. 4b. The apparatus for moving the plate-like heat shield elements (62a and 62b) may comprise a pair of air cylinders (each indicated at 66) or any other suitable device(s) which are mounted to a suitable support (68) and actuatable from a predetermined location to move their corresponding plate members back and forth relative to each other.

The end of the first plate member (62a) is formed with an essentially straight end edge so that when moved into position for welding, it is adapted to abut the portion of the connector tab (34) positioned against the straight leg portion (32a) of terminal connector 32. However, the end edge of plate member 62a may also be formed with a small projection (indicated at 63a), corresponding generally to the thickness of such tab portion, so that the projection abuts connector portion 32a and the entire edge of plate member 62a helps to positively locate connector portion 32a, with the tab portion located therebetween. The other plate member (62b) is formed with a projecting portion (63b) defining an essentially straight edge on its inside edge (i.e., the edge facing the end edge of plate number 62a), which is adapted to abut a portion of one or more tab(s) 34 positioned against the other side of terminal connector portion 32a.

Figure 4A:
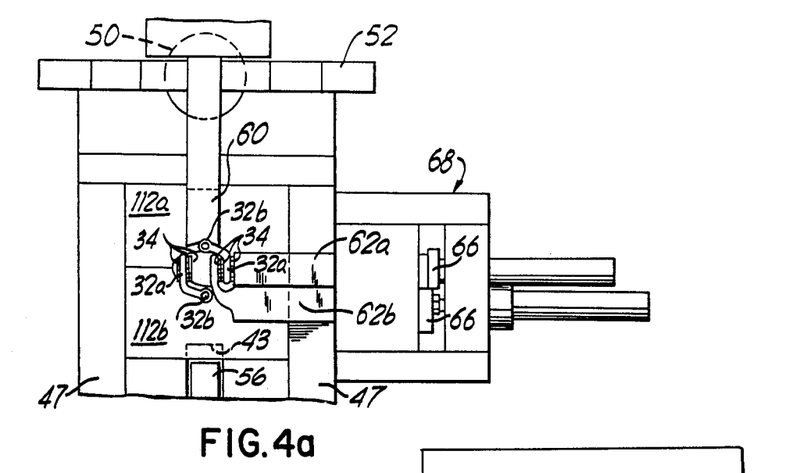
FIG. 4a is a sectional view taken along lines 4a—4a FIG. 1.
Figure 4B:
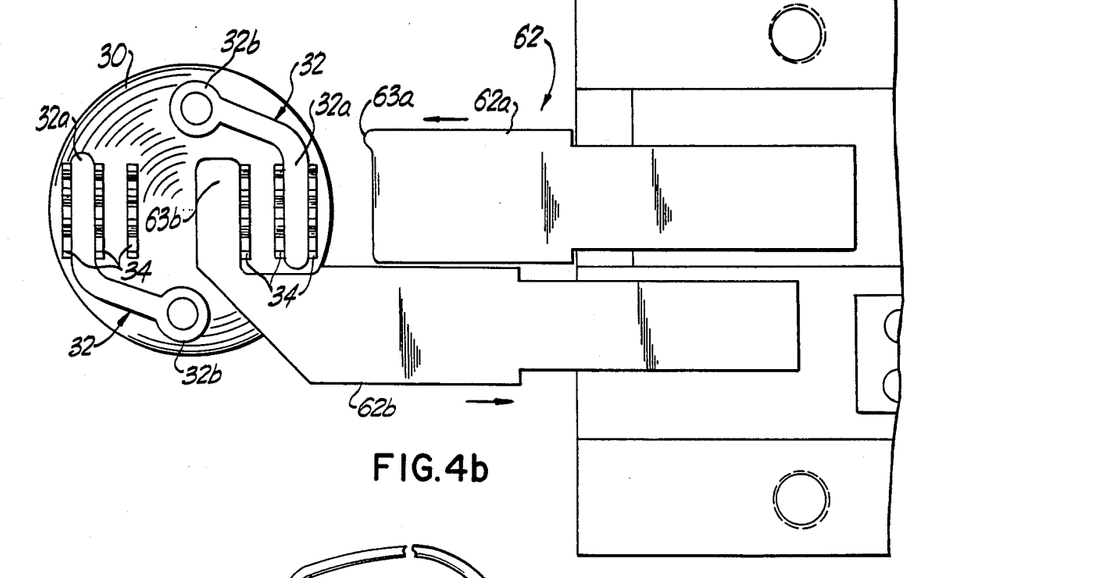

In operation, as the lifting assembly moves battery cell core 30 into welding position, the two plates 62a and 62b are maintained separated, as shown in FIG. 4b, to provide a gap for accommodating the straight leg portion (32b) of connector 32 as well as the (here, three) electrode plate tabs (34) prior to the actual welding step. Once battery cell core 30 has been located in the welding position, the plate members are moved towards each other (in the directions indicated by the arrows in FIG. 4b) by actuation of the two cylinders (66), one extending its shaft and the other retracting its shaft. As the cooperating edges of the heat sink plates converge in almost scissor-like manner, they pinch the tabs (34) against the connecting portion (32a) of the terminal connector to ensure a good weld therebetween.

In addition, the welding target is substantially thermally isolated from the cell core itself so that if the torch "flame" inadvertently strays off the target, it will strike the heat sink rather than any portion of the cell core, to prevent the possibility of welding the wrong structures together and causing an inherent short circuit in the cell. Similarly, the heat sink also helps withdraw a certain amount of heat generated in the target during the welding operation to prevent the target materials from melting too much and dripping down into the cell core. This is particularly important since the grids are made of lead which has a relatively low melting point.

Referring again particularly to FIG. 8, the welding apparatus may include a torch shield (shown in phantom and indicated at 65) which is positionable direcly under the tip of torch head 14 to block projection of torch "flame" 15. Shield 65 may be coupled to another air cylinder (not shown), or other suitable device adapted to extend shield 65 over the target area directly under the torch head tip and to retract the shield to the position indicated in FIG. 8. In this way, a further control (in addition to the on-off control of the torch apparatus) is provided to ensure that the target is exposed to the torch "flame" for the prescribed period of time. In addition, when extended, the torch shield encloses the "pilot" within the torch head and helps to strike the torch "flame" when desired. The heat shield and heat sink members are made of a highly heat resistant material such as Kulite 112 sold by the Kulite Company of New Jersey.

Figure 9:
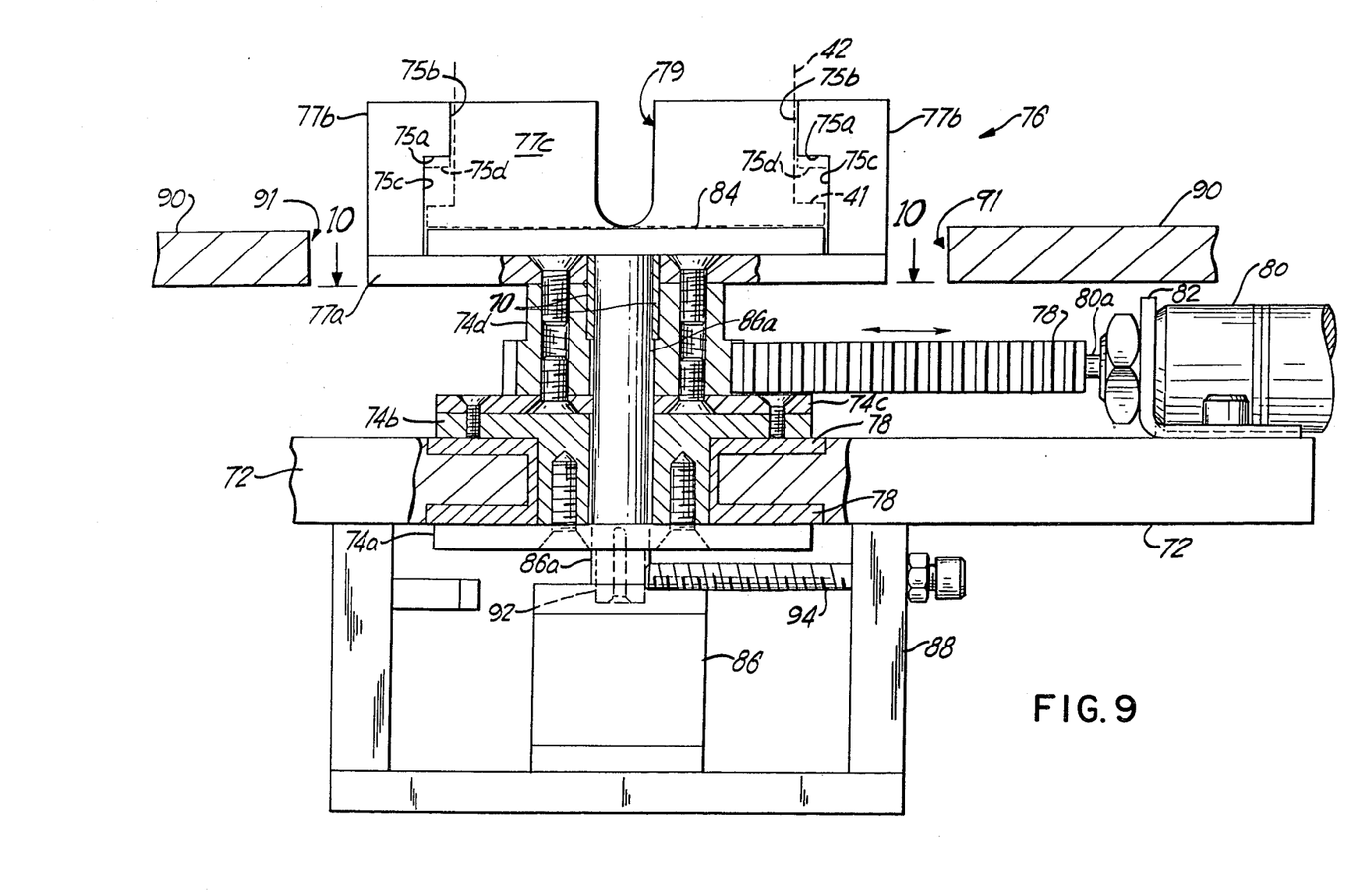
FIG. 9 is an elevation view, partially sectioned, of the apparatus shown in FIG. 8.
Figure 10:
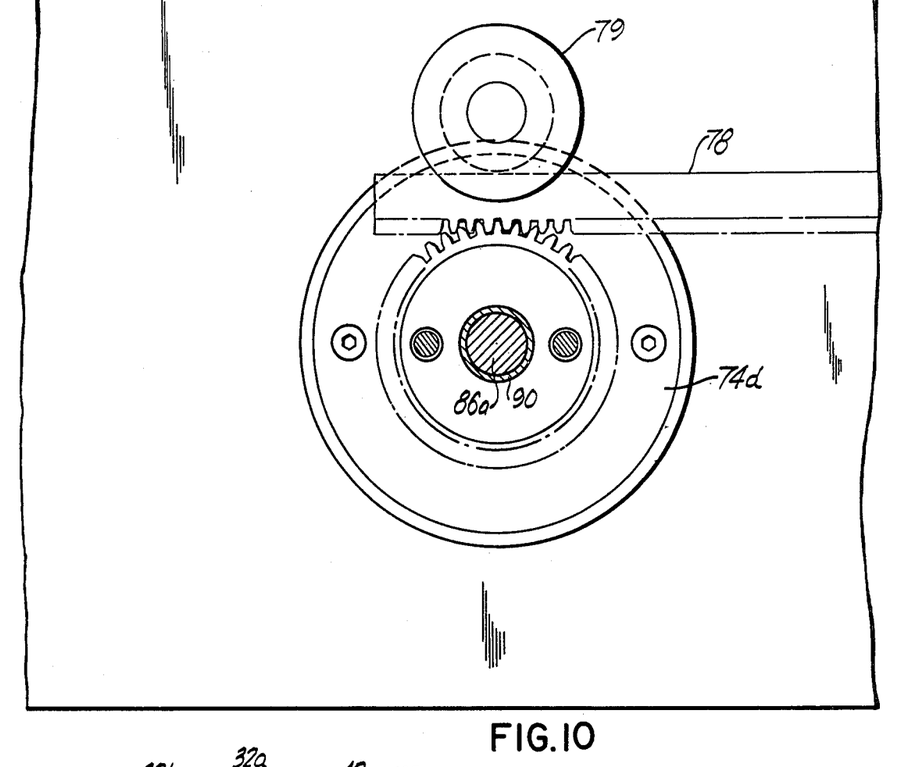
FIG. 10 is a sectional view taken along section lines 10—10 of FIG. 9.

Turning now to FIGS. 8-10, there is shown another embodiment of a support assembly (12) adapted to raise and lower cell core 30 to the proper welding position. As here embodied, the support assembly is further adapted to rotate cell core 30 so both terminal connectors (32) can be welded in an essentially automatic process, without requiring manual rotation of the cell core.

Referring particularly to FIG. 9, the lifting/rotating mechanism (indicated generally at 70) includes main support member 72 (which is analogous to base member 44 described above) to which a support assembly is rotatably mounted. The support assembly is made up of disc-like bottom plate 74a, flanged cylindrical member 74b, connecting plate 74c and cylindrical gear member 74d, all coupled together by threaded fasteners, as indicated in FIG. 9, and mounted for rotation relative to support plate 72 by a pair of suitable bearing discs (78) which may be thrust-type bearings or bushings. A cell-holder support (indicated generally at 76) is mounted to the top of gear member 74d for supporting cell-holder 42 as will be described more fully below.

Gear member 74d is formed with gear teeth over a portion of its outer cylindrical surface, as indicated in FIG. 10. The teeth preferably extend over at least about half the exterior surface of gear member 74d to permit a full 180° revolution of cell, holder support 76, as described more fully below. Operatively coupled to the gear teeth on cylinder member 74d is a relatively elongate gear rack member (78), formed with gear teeth proportioned to engage the teeth on member 74d. Gear rack 78 is attached to air cylinder 80 (or any other suitable device for moving rack 78 in directions parallel to its longitudinal axis) which is secured to support plate 72 by a suitable bracket (82). Thus, rack 78 is mounted to the end of the shaft (80a) of cylinder 80 for movement in the directions indicated by the double arrow in FIG. 9. A roller (indicated at 79 in FIG. 10) is also rotatably mounted to support 72 and positioned to abut the back of rack member 78 to keep it in operable engagement with the teeth on cylindrical member 74d.

Cell support 76 comprises a disc-like bottom member (77a), attached to cylindrical member 74d, with a pair of guide members (77b) upstanding therefrom, adapted to hold the cell-holder (described more fully below) during the rotation step. Guide members 77b, like guides 47 described above, have an inverted generally L-shaped configuration and are formed along the two sides of base member 77a but provides a taller slot (between shoulders 75a and the top of member 77a). A back stop (77c) also extends upwardly from the back edge of base member 77a to provide a stop against which the cell-holder abuts when positioned in the support for proper locating relative to torch head 14 for the welding operation. The fourth edge of base member 77a may be left open to facilitate slidable insertion of the cell-holder into the slots provided by guides 77b and to permit automatic removal of the cell-holder from the support member once welding has completed, as by an air cylinder actuated ram-like device (not shown) which projects a ram through the slot (79) formed in back stop 77c.

The support member (76) also includes a disc-like plate (84) resting on top of, but not attached to bottom member 77a to permit the cell-holder to be raised and lowered when desired. For this purpose, a lifting device, such as an air cylinder (indicated at 86), is fixedly attached to the bottom of base member 72 by a suitable bracket (indicated at 88). The shaft (86a) of air cylinder 86 extends upwardly through suitably proportioned openings (which together define a continuous passage for shaft 86a) formed in members 74a-d and 77a, and the end edge of shaft 86a is adapted to abut the bottom of plate 84. The openings in members 74a-d and 77a are proportioned a small amount larger than shaft 86a so that such members are free to rotate about the shaft. In addition, the free end portion of shaft 86a is seated within a cylindrical bearing sleeve (90) which is affixed to members 77a and 74d to position the free end of shaft 86a within the passage and ensure that the shaft will not interfere with rotation of the cell-holder support assembly.

As can be seen from FIGS. 8 and 9, a worktable member (90) surrounds cell-holder support 76, with the top surface of table 90 co-planar with the top surface of plate 84 to permit the cell-holder (42) to be placed on top of table 90 and moved onto and off of plate 84 by simple sliding movement of the cell-holder. Since the cross-sectional configuration (as principally defined by member 77a, seen in plan view in FIG. 8) of cell-holder support 76 is generally square, the opening (91) in table 90 must be large enough to accommodate the arc traveled by the corners thereof during rotation. However, it will be understood that plate 77a could simply be made round while guides 77b are located as described above but plate 84 is squared as described above. In any event, at least member 84 (and preferably member 77a as well) includes an extended portion (indicated at 84a) formed on its front side (i.e., the side adjacent the open edge of member 77a), which has a circular edge projecting to the edge of table 90 to bridge any gap between table 90 and the squared portion of member 84 so that the cell-holder can be easily slid along table 90 and onto the cell-holder support.

In order to guide the cell-holder onto support 76, guide rails 93 are located on the top of table 90. Guide rails 93 are spaced apart by a distance equal to about the width of the bottom 41, or about the same distance as surfaces 75c on guides 77b of support assembly 76. When cell-holder 42 is to be mounted on support assembly 76, the assembly is rotated with arcuate portion 84a and guides 77b aligned with guide rails 93. The cell-holder is then slidably translated through guide rails 93 and directly onto member 84 while simultaneously being guided by edges 75b of guides 77b for proper alignment on support 76. The side edges of bottom plate 41 will be abutting, or almost abutting, surfaces 75c and the sidewall portions of the cell-holder will be abutting, or almost abutting, surfaces 75b.

As preferably embodied, a cam (indicated in phantom at 92) is attached to the bottom of plate 74a, radially outwardly of the opening in plate 74a (so as to be located behind shaft 86a as viewed in FIG. 9), and a stop member (94), which may be a large screw or the like, is mounted to bracket 88 for limiting the rotational travel of the support assembly in one direction. A second stop member (not shown) may be mounted to bracket 88 on the opposite side to limit rotational travel in the other direction so that the entire support assembly rotates only about 180°.

In operation, the cell-holder (42) with cell core 30 placed therein, is slid along table 90, onto plate 84 and into the space defined by guides 77b until the cell-holder abuts back stop 77c. Once the cell-holder is properly positioned, air cylinder 86 is activated to extend shaft 86a so that it pushes up against plate 84, raising plate 84 (and the cell-holder sitting thereon) until the upwardly-facing edges of the bottom plate (41) of cell-holder 42 abut the shoulders (each indicated at 75a) of guide members 77b. It will be understood that the distance the cell-holder is raised will be determined so that the top of the post portion on the terminal connector (32) to be welded will abut post placement member 60' which is secured to a suitable support as shown in FIG. 8. (It will be understood that post placement device 60/61, described above, could be used and the distance the cell-holder is raised will be adjusted accordingly, although placement device 60' offers simplicity of parts). The connector portion (32b) of that particular connector is thence welded to the appropriate tab portions substantially as described above.

Once the first weld is completed, air cylinder 86 is again actuated, but this time to retract shaft 86a so that plate 84 (and, therefore, the cell-holder) is lowered back to its initial position. Cylinder 80 is then actuated to extend its shaft 80a and, therefore, move rack member 78 across the gear teeth formed on cylindrical member 74d to rotate the support assembly until cam 92 abuts stop 94. (It will be understood that cylinder 80 and/or its actuating mechanism may be adapted to cease rotation of the support assembly at about that same point so that the impact between cam 92 and stop 94 is not so great as to jar loose any of the components on the cell core). After the cell-holder has been rotated, cylinder 86 is again activated to extend shaft 86a so that the other terminal connector (32) on the cell core can be welded to its corresponding tab(s) 34 in substantially the same way.

Once the other terminal has been welded, cylinder 86 is again activated to retract shaft 86a for lowering the cell-holder which can then be removed from the support assembly by projecting a ram-like device (not shown) through slot 79 to push the cell-holder through a similar set of guide rails (not shown) located to place the cell-holder in the desired position for the next operation. Thereafter, the support assembly can be rotated back to its initial position for receiving the next cell core to be welded. It will be understood that before returning to its initial position, the support assembly may first be rotated with its open edge facing any desired direction for removing the cell-holder (with the exit guide rails, if any, appropriately positioned) so that the cell core may be moved to the next assembly station.

As preferably embodied, the front portion (i.e., that adjacent the open edge of member 77a) of each guide 77b is formed with a small lock tab (indicated in phantom at 75d) extending downwardly relative to its corresponding surface 75a. The back edge of tabs 75d slope upwardly towards its surface 75a at an angle (about 45°). Thus, as cell-holder 42 is raised on support plate 84, the rearwardly sloping back edges of lock tabs 75d will engage the front edges of bottom 41 to urge cell-holder 42 back against back stop 77c for automatically locking the cell-holder in position without requiring any moving locking apparatus such as lock mechanism 54–59 described above.

Figure 11A:
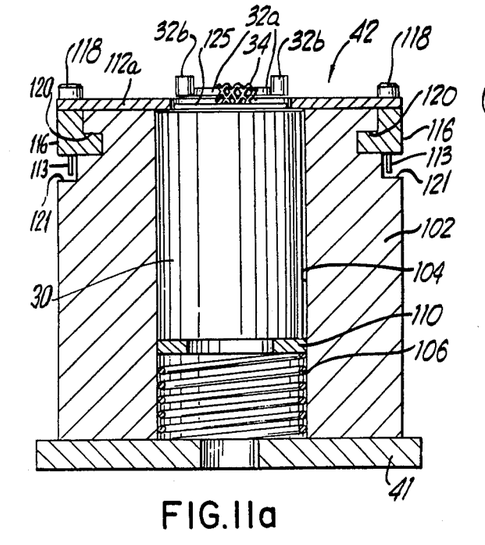
FIG. 11a is a sectional view of the cell holder for use with the apparatus shown in FIGS. 1-3 and 8-10.
Figure 11B:
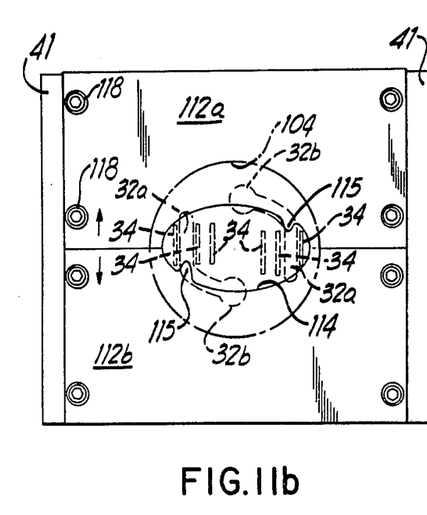
Figure 11C:
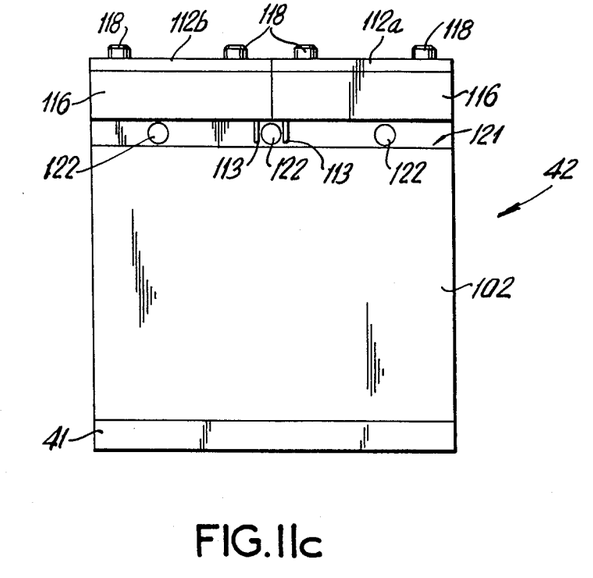
FIG. 11c is a side elevation view of the cell holder shown in FIGS. 1a–b.

Turning now to FIGS. 11a-11c, there are shown various views of the cell-holder (42) which may be used with the lifting apparatus shown either in FIGS. 1–3 or in FIGS. 8–10. Cell-holder 42 includes a central portion (102) having a generally rectangular cross section (FIG. 11b) and a generally cylindrical opening (104) proportioned to receive the cell core (30) for a particular sized cell. The bottom (41) of the cell-holder extends outwardly along two side edges thereof for engagement by guide members 47 (FIGS. 1-3) or 77b (FIGS. 8-10), all as described above. A spring (106), or other suitable biasing means, is located in opening 104 adjacent bottom 41 and support cell-support plate (110) to bias cell core 30 against the top of cell-holder 42 as will be described more fully below.

The top of cell-holder 42 is formed in two parts, 112a and 112b, which are slidably mounted to the top of central portion 102 and which define a generally elliptical opening (114) when closed together, adapted to provide sufficient exposure for the protruding tabs (34) and to enable support for terminal connectors 32. Each side edge of the two top parts (112a and 112b) is secured to an L-shaped slide member (each designated 116) by, for example, threaded fasteners 118. It will be understood that there are a pair of slide members attached to each top part. The horizontal leg of each slide 116 is adapted to be slidably received within a correspondingly shaped slot (indicated at 120) formed on each side of central portion 102 so that the top parts may be slidably separated, as indicated by the arrows in FIG. 11b, to permit removal of a welded cell core and insertion of another.

As preferably embodied, means are provided on the cell-holder to limit the slidable travel of top parts 112a and 112b. To this end, projecting stops (122), which may be threaded fasteners, are attached to central portion 102 in recesses 121, as shown in FIG. 11c (although not illustrated in FIG. 11a for clarity). In addition, a pin (113) is mounted to the bottom of each slide 116 and extends downwardly into recess 121. Pins 113 are positioned to abut stops 122 when the top parts are separated a sufficient distance to enable removal and insertion of cell cores.

In operation, the top parts (112a and 112b) are separated and a cell core is inserted into opening 104 on top of biased support plate 110. The top parts are then closed over the cell core while the cell core is held down against spring 106 so that when the top parts are fully closed, the top of the cell core is biased slightly agianst the bottom of top parts 112a and 112b. In addition, as the top parts are closed together, the projecting portions (115), which project into elliptical opening 114, become inserted into the space between the radially outermost tab 34 and the tab adjacent thereto to ensure sufficient clearance for insertion of connector portion 32a between those two tabs. The terminal connectors (32) are then placed between the two tabs 34 separated by projections 115, with various portions of the bottom of the connector seated on the top surfaces of the parts 112a and 112b, as indicated in phantom in FIG. 11b. Thereafter, all three tabs may be manually pinched over the adjacent connecting portion 32a. As indicated in FIG. 11a, openings (not numbered) may be formed in bottom 41 and disc-like support 110 to preclude the possibility of any air pressure building up in core-accommodating opening 104. Projections 115 are at least about as wide as connector portions 32a to ensure that, when top parts 112a and 112b are brought together, the projections will keep the tabs (34) separate to ensure that the tab portion 32a can be inserted between those two tabs.

Advantageously, a plastic disc (125 in FIG. 11a) is located on the top of the cell core to isolate the terminal connectors from the rest of the cell core. Disc 125 has suitably proportioned cut out portions to accommodate tabs 34. In addition, it may be advisable to provide some type of temporary clamping device (not shown) on the cell-holder for holding the terminal connectors prior to welding, to prevent dislocation during rotation. It will be understood that top parts 112a and 112b not only help locate the terminal connectors but also serve as additional heat sink means for removing excess heat.

It will be appreciated by those skilled in the art that the invention in its broader aspects is not limited to the specific embodiments shown and described herein and that variations may be made therefrom, which are within the scope of the accompanying claims, without departing from the principles of the invention and without sacrificing its chief advantages.

What is claimed is:

1. An improved method for welding a battery terminal connector to the tab portions of an electrode grid in a wound battery cell core, using a torch flame emanating from the torch head of an ionized gas arc torch apparatus, wherein the improvement comprises:

controllably varying, during a welding operation, the angular orientation of the torch flame relative to a plane passing through the tip of the torch head, such that the tip of the torch flame can be moved substantially in two dimensions to provide a generally elliptical weld pattern and permit welding over an area portion of the connector and tab portions to be welded while the battery cell core and the torch apparatus remain essentially stationary relative to each other.

2. An improved method according to claim 1, wherein said step of controllably varying the angular orientation of the torch is carried out by controllably varying magnetic fields around the torch, said magnetic fields being generated from more than two locations around the tip of the torch head.

3. An improved method according to claim 2, wherein said step of varying magnetic fields around the torch head is carried out by activating at least four electromagnet elements positioned around the torch in generally oppositely disposed pairs such that one end of each electromagnet element forms a magnetic pole which co-acts with the magnetic poles of the other electromagnets.

4. An improved method according to claim 3, wherein the electromagnet elements are symmetrically located around the torch.

5. An improved method according to claim 1 or 2, wherein the improvement, further includes the step of positioning the electrode tabs and the terminal connector of the cell core to be welded by moving the cell core towards and away from the torch head in directions substantially parallel to the longitudinal axis of the torch flame prior to varying its angular orientation.

6. An improved method according to claim 5, wherein the improvement further includes positioning heat sink means about the electrode tabs and the terminal connectors after the cell is located in position for welding.

7. An improved method according to claim 6, wherein said improvement further includes the steps of positioning heat shield means in front of the torch prior to welding to prevent the torch from emanating beyond the shield but removing the heat shield means from in front of the torch head when welding is desired.

* * * * *